United States Patent

[11] 3,627,232

| [72] | Inventor | James W. Ramsay<br>Yuma, Ariz. |
|---|---|---|
| [21] | Appl. No. | 55,795 |
| [22] | Filed | July 17, 1970 |
| [45] | Patented | Dec. 14, 1971 |
| [73] | Assignee | The United States of America as<br>represented by the Secretary of the Navy |

[54] ACQUISITION AND RETRIEVAL METHOD AND APPARATUS FOR RECOVERING EJECTEES FROM DISABLED AIRCARFT
8 Claims, 8 Drawing Figs.

[52] U.S. Cl. ..................................... 244/1 R,
244/138, 244/152
[51] Int. Cl. ...................................... B64d 17/00
[50] Field of Search........................................... 244/1, 2,
136, 137, 138, 142, 152, 3, 14

[56] References Cited
UNITED STATES PATENTS
3,207,480   9/1965   Fulton, Jr. ..................... 244/142 X Primary Examiner—Trygve M. Blix
Assistant Examiner—Carl A. Rutledge
Attorneys—R. S. Sciascia, George J. Rubens and J. W. McLaren ABSTRACT: A method for snaring the inflated parachute of an ejectee while descending from a disabled aircraft by an accompanying high-speed aircraft and towing the parachute and the suspended aircrewmen to a safe recovery area where the parachute and its load is released to resume its normal free descent into the safe area for rescue by conventional means.

PATENTED DEC 14 1971
3,627,232
SHEET 1 OF 2
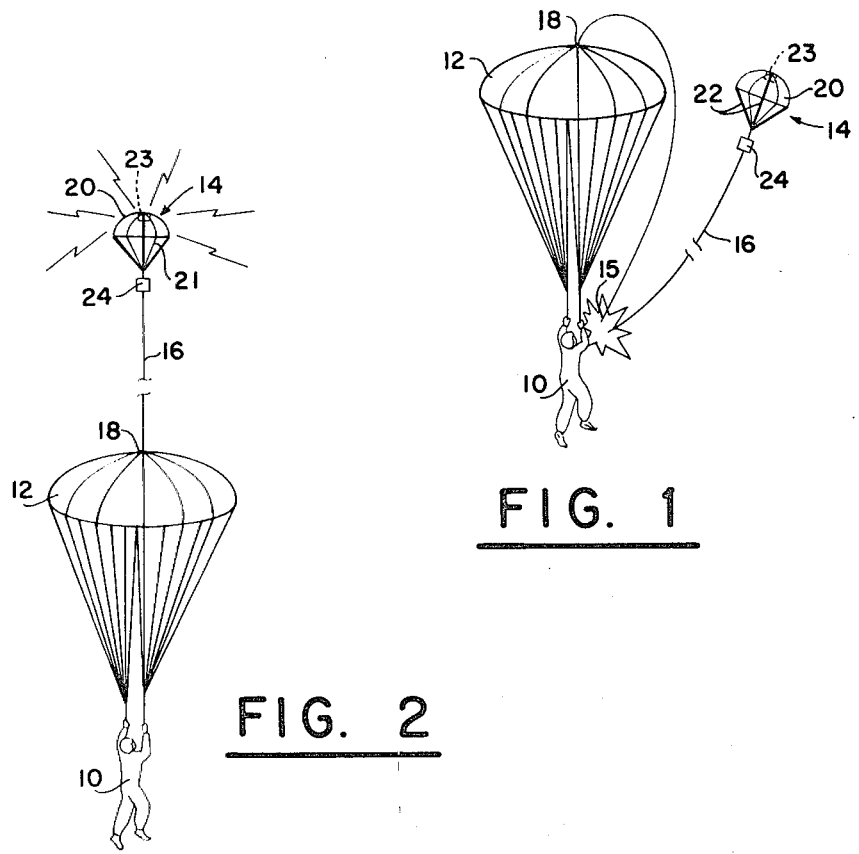
FIG. 1
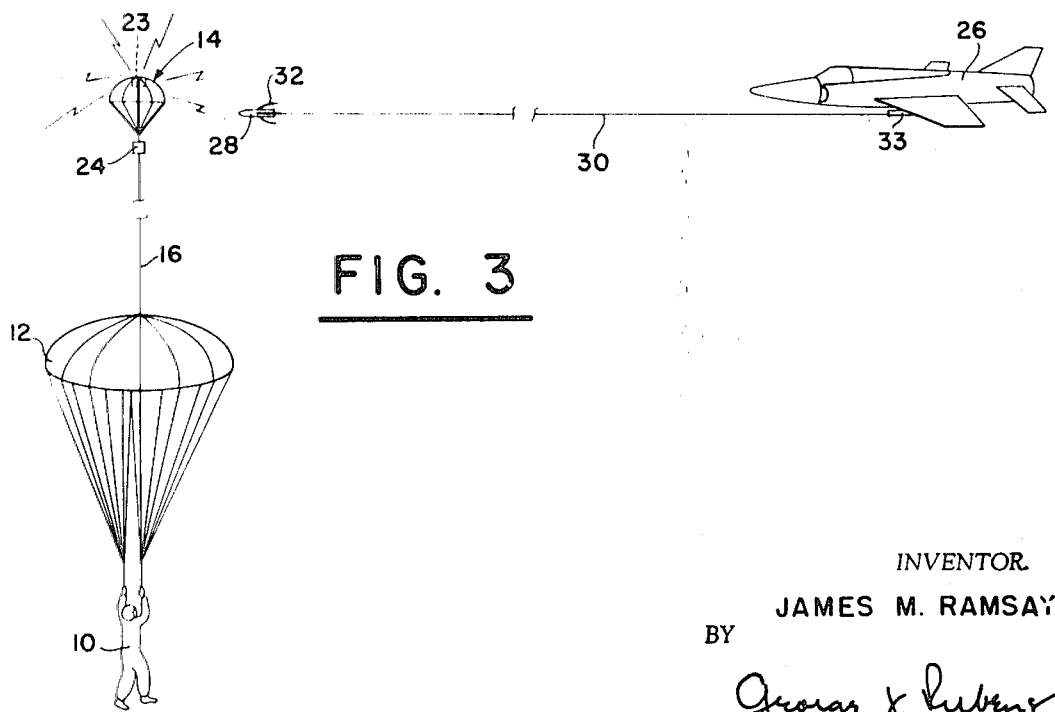
FIG. 2
FIG. 3
INVENTOR.
JAMES M. RAMSAY
BY
*George J. Rubens*
ATTORNEYS INVENTOR
JAMES M. RAMSAY
BY
George J. Rubens
ATTORNEYS

3,627,232

ACQUISITION AND RETRIEVAL METHOD AND APPARATUS FOR RECOVERING EJECTEES FROM DISABLED AIRCARFT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to search and rescue systems, and more particularly to such a system that enables in-flight recovery by a high-speed accompanying aircraft which tows the parachutist to a safe area for normal recovery operations.

Experiences by the Armed Forces in the Vietnam operations have shown that the fatality rate among pilots and aircrewmen is very high where ejection occurs over enemy held land because of the danger of enemy fire and the difficulty of access for rescue teams. In fact, the rescue rate is so much better where ejection occurs over water that it is a preferred ditching procedure by seasoned pilots whenever possible.

The present accepted method employed by the military services for recovering ejected aircrewmen is by means of specially designed search and rescue (SAR) helicopters. The reaction time under actual combat conditions from the time of ejection by the pilot from the disabled aircraft to the time of arrival on the scene of the SAR helicopters is a minimum of 30 minutes. During this time the ejected aircrewman is practically a stationary target for enemy fire during his parachute descent, and he may be descending into an area of certain capture or death. After arrival in the general area the SAR unit must locate the downed airman, vector him to a clear area if necessary, and drop a sling. In addition, it is possible that a SAR crewman may be required to assist in the pickup if the downed aircrewman is hurt in the landing. Thereafter, the personnel on the ground must be winched back to the SAR helicopter before it can leave the rescue area. Because of the excess time involved in the rescue operations, the downed airman, SAR helicopter and crew are exposed to capture or ground fire, and the large fatality rate in SAR personnel and equipment attest to this problem. Accordingly it is critical that search and rescue operations be accomplished in the shortest period of time to minimize loss of valuable personnel and equipment and to successfully accomplish the mission.

SUMMARY OF THE INVENTION

This invention provides a means for snaring the inflated parachute of an ejected aircrewman during normal descent and for towing the parachute with aircrewman to a safe recovery area. The recovery aircraft can be one of the accompanying high-speed strike aircraft which is provided with a means for acquiring the parachute, such as a launchable, tethered guided missile having homing ability. The parachute is provided with a tethered recovery package which contains a buoyant device for suspending the package by means of a pickup line above the main parachute to be snared. The recovery package includes a beacon on which the missile homes-in to snare the package. After the recovery aircraft tows the parachute and its occupant to a safe area, the lines connecting the parachute to the aircraft and to the package are severed to permit the main parachute to inflate and the aircrewman to resume his safe, free descent into the safe area.

STATEMENT OF OBJECTS OF INVENTION

A principal object of this invention is to provide an improved and accelerated method and apparatus for recovery of aircrewmen following ejection in a hostile environment.

A corollary object is to enable such recovery by means of a high-speed accompanying aircraft of the type from which the aircrewman ejected thereby providing practically instant reaction time.

A further object is to provide a rescue operation that will minimize loss to personnel and equipment and increase the likelihood of a successful search and recovery mission.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a diagrammatic view of an aircrewman having ejected from a disabled aircraft (not shown) and explosively deploying a recovery package.

FIG. 2 is a similar view of FIG. 1 where the recovery package is fully extended above the main chute and is generating a homing signal.

FIG. 3 is a diagrammatic view of the recovery aircraft making its final approach in its recovery operation having fired a missile which is homing in on the beacon in the recovery package.

DESCRIPTION OF THE PREFERRED EMBODIMENT

Figure 5:
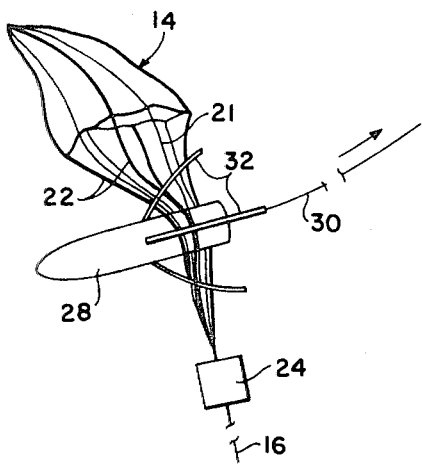
FIG. 5 is a similar view as FIG. 4 with the missile being dragged back through the recovery package to snare the engagement lines of the recovery package.

Referring to the drawing where like reference numerals refer to similar parts throughout the figures there is illustrated in FIG. 1 an aircrewman 10 having been ejected from his disabled aircraft (not shown) which is usually, but not necessarily, a high-speed strike aircraft. Aircrewman 10 is shown freely descending by means of a main parachute 12 into a landing area which can be assumed is unsafe being in enemy held territory.

Figure 4:
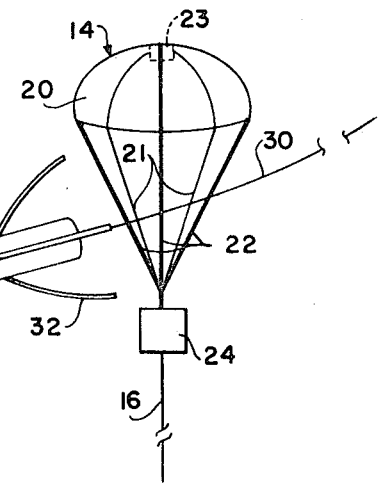
FIG. 4 is an enlarged diagrammatic view of the missile passing through the recovery package, fins on the missile being extended to snare the engagement lines of the recovery package.

To initiate the novel recovery system, aircrewman 10 deploys a recovery package 14 supported in any suitable manner on the parachute harness by firing a conventional pyrotechnic device 15, i.e., drogue gun, or the like. Recovery package 14 is anchored by a pickup line 16 to apex 18 of main parachute canopy 12. Recovery package 14 includes a small, inflatable device such as a pilot parachute 20, balloon or the like which maintains the recovery package at an elevated position above the main parachute. Pilot parachute 20 is constructed with conventional suspension lines 21 and extra strength engagement lines 22, as shown in FIG. 4. A conventional signal source, such as a beacon 23 is suitably supported within the recovery package and is provided with an antenna which may be incorporated in suspension lines 21 and/or engagement lines 22 to provide a homing target for a purpose to be described. A conventional line-cutter device 24, preferably of the pyrotechnic type, is secured between pilot parachute 20 and pickup line 16 and is designed to cut pickup line 16 for jettisoning the recovery package as will be described under "Operation."

As a component of the search and recovery system, there is illustrated in FIG. 3 a strike aircraft 26 which may be of the same or similar type as the downed aircraft of aircrewman 10 and one of the associated aircraft deployed in the strike force. This type of aircraft has an existing missile launcher tube (not shown) from which can be launched a search and recovery missile 28 which is tethered to the aircraft by a recovery or tow line 30. It is preferred that recovery line be fabricated of a material that will have a high modulus of elasticity, such as nylon rope, to absorb some of the initial shock to which aircrewman 10 may be subjected to when pickup is effected.

Figure 6:
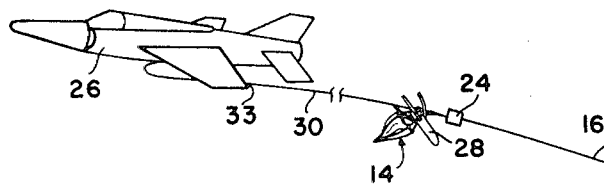
FIG. 6 is a diagrammatic view of the snared recovery package, main parachute and aircrewman being towed by the recovery aircraft to a safe recovery area.
Figure 7:
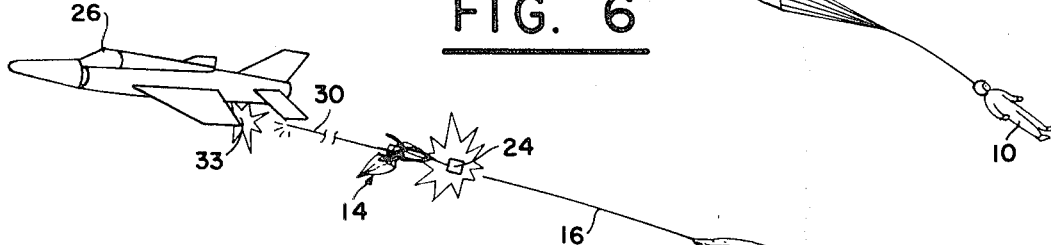
FIG. 7 is a similar view as FIG. 6 with the recovery line from the recovery aircraft to the missile and the tethered recovery package line both being severed to free the main parachute and aircrewman.

Missile 28 has a homing capability for zeroing in on beacon 23 of the recovery package to insure passage of the missile between engagement lines 22, as shown in FIGS. 3 and 4. Extendable spring-loaded fins 32 are provided on the missile that are automatically extended as soon as the missile leaves the launching tube (not shown). The deployed fins function to snare the engagement lines 22 of the recovery package when tension is applied to recovery line 30 as shown in FIG. 5 to enable the towing of the main chute 12 and the aircrewman 10 from the unsafe area to a safe area, as shown in FIG. 6. When the towing aircraft reaches the preselected safe recovery area, recovery line 30 is severed at the towing aircraft 26 by any type of conventional line cutter 33. Upon relaxation of recovery line 30, line cutter 24 is designed to automatically actuate to sever line 16 and jettison recovery package 14. This action frees main chute 12 to again inflate for resumption of its normal descent with the aircrewman in the safe area.

OPERATION

The method of operation of the novel search and recovery system is probably apparent from the various figures. As an aircrewman 10 bails out of his disabled aircraft (not shown), most likely to be one of the accompanying aircraft of the strike force, he deploys recovery package 14 which rises to a safe elevated position above the main chute 12 being tethered by pickup line 16. An accompanying aircraft 26, which most likely is to be one of the same type of aircraft of which the strike force is composed, being on the scene, is in a position to immediately initiate the search and recovery operation, which for purposes of this invention is to transfer the ejected aircrewman from an unsafe recovery area to a safer recovery area, such as over water or over friendly land.

Figure 8:
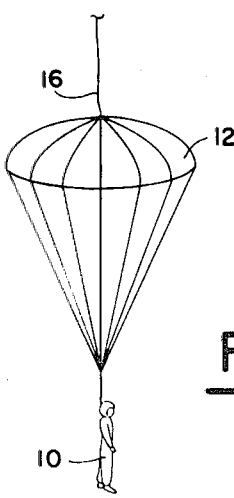
FIG. 8 shows the main parachute again inflated after being cut free from the recovery aircraft and the recovery package and resuming its normal descent.

Assuming that the ejected aircrewman 10 is descending in an unsafe area, accompanying strike aircraft 26 launches the search and recovery missile 28 at the recovery package 14 trailing the recovery line 30 which is being payed out from the aircraft. Missile 28 homes in on the beacon antenna in the recovery package and passes through its engagement lines 22. When tension is applied to recovery line 30 by movement of the aircraft or any other suitable means extendable missile fins 32 snare engagement lines 22 to capture recovery package 14 as well as main chute 12 and associated aircrewman 10. During this operation, aircraft 26 continues its flight at a minimum speed, the stretchability of recovery line 30, pilot parachute 20, line 16, as well as the inherent catenary curve formed thereby absorbs much of the shock by the sudden pickup that is transmitted to parachutist 10. Recovery aircraft 26 then tows the captured recovery package and its appendages to the preselected safe area where main chute 10 and the parachutist are cut free by pilot command causing recovery line 20 adjacent the aircraft to be severed by line cutter 33. Relaxation of the tension on line 30 initiates line cutter 24 to cut line 16 and jettison recovery package 14 from the main parachute. As shown in FIG. 8 main chute 12 and parachutist 10 are now able to descend freely into the safe area for normal recovery.

The novel method and system of this invention enables the immediate recovery by fellow pilots in flight of an aircrewman having ejected from a disabled aircraft over enemy-held territory for transfer to a safer area for conventional recovery, thereby preventing capture of the downed pilot and injury by enemy forces. While this novel in-flight transfer system is in process, conventional search and rescue helicopters can be alerted for rendezvous in the preselected safe area where the aircrewman is to land, insuring a quicker rescue which may result in the savings of lives and safety of rescue equipment.

Obviously many modifications and variations of the present invention are possible in the light of the above teachings. It is therefore to be understood that within the scope of the appended claims the invention may be practiced otherwise than as specifically described.

I claim:

1. A method of transporting by means of a recovery aircraft a parachuted load during descent, from one area to another area including the steps of:
   deploying a recovery package from said parachute during descent in said one area;
   transmitting a homing signal from said recovery package;
   firing a missile having a tethered line from the recovery aircraft capable of homing in on said signal;
   snaring the recovery package by said missile; and
   towing the recovery package and its associated appendages by said recovery aircraft to said another area.

2. A method of rescuing by a recovery aircraft of an aircrewman having been ejected by parachute from a disabled aircraft from one area to another area including the steps of:
   deploying a recovery package that elevates above the parachute during descent in said one area;
   transmitting a homing signal from said recovery package;
   firing a missile having a tethered line from the recovery aircraft capable of homing in on said signal;
   snaring the recovery package by said missile;
   towing the recovery package and associated appendages by said recovery aircraft to said another area;
   severing the tethered line between the aircraft and the recovery package to enable the parachute to descent in said another area.

3. An in-flight recovery system for a parachute and its load during normal descent including the combination of:
   a recovery package adapted to be released from said parachute and its load;
   means for connecting the recovery package to said parachute;
   said package including an inflatable means having a tethered line to the parachute;
   means in said recovery package for generating a homing signal;
   a homing missile adapted to be fired at said recovery package from a recovery aircraft;
   a towing line connecting the missile to the aircraft;
   said missile having means for snaring said package,
   whereby said snared recovery package and appendages can be towed in flight by the recovery aircraft.

4. The combination of claim 3 wherein a line cutter is connected in said connecting means for severing the recovery package from the parachute.

5. The combination of claim 4 wherein said line cutter is automatically operable on the absence of a predetermined tensile force on the towing line.

6. The combination of claim 4 wherein said inflatable means is a second parachute connected to the tethered line by suspension lines.

7. The combination of claim 6 wherein said suspension lines provide the support for an antenna connected to the homing signal generating means.

8. The combination of claim 3 wherein the snaring means on said missile comprises a plurality of spring-loaded fins normally biased to an extended position.

* * * * *